United States Patent [19]
Yamin

[11] Patent Number: 5,998,052
[45] Date of Patent: Dec. 7, 1999

[54] COMPOSITE BATTERY AND METHODS OF FORMING SAME

[75] Inventor: Herzel Yamin, Rehovot, Israel

[73] Assignee: Tadiran Batteries Ltd., Kiryat Ekron, Israel

[21] Appl. No.: 08/982,522

[22] Filed: Dec. 2, 1997

[51] Int. Cl.$^6$ .................................................. H01M 12/00
[52] U.S. Cl. ............................... 429/9; 429/49; 429/123; 429/101; 429/105; 429/50; 429/231.95; 320/103; 320/126; 320/137
[58] Field of Search ............................... 429/9, 123, 101, 429/105, 50, 231.95, 49; 320/103, 126, 137, FOR 114, FOR 115

[56] References Cited

U.S. PATENT DOCUMENTS 5,568,038  10/1996  Tatsumi .................................... 320/103

OTHER PUBLICATIONS

Strand, Harold. "Can Dry Cells Be Recharged?", Popular Science, May 1945, p. 194, May 1945.

*Primary Examiner*—Maria Nuzzolillo
*Assistant Examiner*—Laura Werner
*Attorney, Agent, or Firm*—Foley & Lardner

[57] ABSTRACT

A composite electrical battery including a primary electrochemical cell and a fully or partially discharged rechargeable electrochemical cell. The rechargeable electrochemical cell is electrically connected in parallel to the primary electrochemical cell. The open circuit voltage of the primary electrochemical cell is significantly lower than the open circuit voltage of the rechargeable cell when the rechargeable cell is fully charged. The self discharge rate of the rechargeable electrochemical cell after electrically connecting the rechargeable electrochemical cell to the primary electrochemical cell is less than a predetermined self discharge rate. The composite battery has an improved current delivery capability for an extended life span compared to the primary electrochemical cell by itself. A method is provided for forming such a composite electrical battery. The method includes providing a primary electrochemical cell, providing a fully or partially discharged rechargeable electrochemical cell, and electrically connecting the primary electrochemical cell in parallel with the fully or partially discharged rechargeable electrochemical cell to form the composite electrical battery. The self discharge rate of the rechargeable electrochemical cell after electrically connecting to the primary electrochemical cell is less than a predetermined self discharge rate for extending the useful lifespan of the composite battery.

24 Claims, 4 Drawing Sheets

COMPOSITE BATTERY AND METHODS OF FORMING SAME

FIELD OF THE INVENTION

The present invention relates generally to the field of electrical batteries and more specifically to the field of composite batteries.

BACKGROUND OF THE INVENTION

Lithium/oxyhalide electrochemical cell systems such as Li/SOCl$_2$ (lithium/thionyl chloride) or Li/SO$_2$Cl$_2$ (lithium/sulfuryl chloride) are primary electrochemical cells having a high energy density and a relatively long operating life. One of the potential practical uses for these systems is as a power source in applications requiring long battery life such as, for example, automatic meter reading systems. Typically, the electrical current consumption of such systems includes a sustained low background current of several microampers and intermittent short current pulses having an amplitude of several tens to several hundreds of milliampers and a duration in the milliseconds range.

Unfortunately, during storage at open circuit conditions or under low background currents the lithium anode of lithium/oxyhalide cell systems becomes passivated by a film which substantially reduces the operating voltage of the battery. As a result, during high current pulses, cell voltage drops to a low level. This low voltage problem can be partially overcome by adding an organic compound such as polyvinyl chloride or an inorganic compound such as SO$_3$ to the cell solution for modifying the passive film to increase its conductivity. However, such additives do not completely solve the passivation problem for the full cell's life span and after a few months the cells develop a similar passivation leading to low cell voltage.

Another possible solution is to increase the surface area of the cell electrode. For example, the low surface area bobbin type design can be replaced with a "jelly roll" type design having a high electrode surface area. Unfortunately, This approach provides only a partial solution to the problem since a one to two years old cell having the jelly roll type design develops a similar passivation and low voltage problem.

Another disadvantage of the jelly roll design oxyhalide batteries is that under certain conditions such as short circuit, compression or nail penetration the cell may explode.

Figure 1:
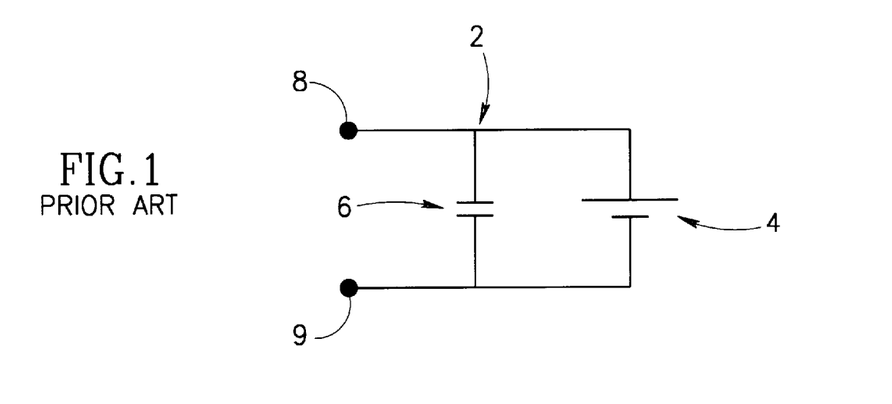
FIG. 1 is a schematic electrical circuit diagram illustrating a prior art electrical circuit including an electrochemical cell connected in parallel with a capacitor.

It is well known in the prior art that a capacitor can be connected in parallel with a primary electrochemical cell such as a Li/oxyhalide cell to form the circuit illustrated in FIG. 1 to which reference is now made. FIG. 1 is a schematic electrical circuit diagram illustrating a prior art electrical circuit 2 including a primary electrochemical cell 4 connected in parallel with a capacitor 6. This arrangement can somewhat reduce the voltage drop which occurs when current is drawn from the circuit 2. Typically, the capacitor 6 is charged by the primary electrochemical cell 4 until the voltage across the capacitor 6 is equal to the voltage across the primary electrochemical cell 4. The electrochemical cell 4 will then need to supply a small current required to compensate for the capacitor leakage. When the circuit 2 needs to apply a large current pulse across a load (not shown) connected to the terminals 8 and 9, part of the current will be initially supplied by the capacitor 6, reducing the amount of current drawn from the electrochemical cell 4 and thus at least initially reducing the resulting decrease in the voltage across the electrochemical cell 4.

Unfortunately, this approach has only limited applications because to sustain an acceptable voltage level for extended durations the circuit 2 will require capacitor 6 to have a very large capacitance value. Typically, such large capacitors will be prohibitively bulky and expensive for many types of applications. Moreover, the larger the capacitor 6, the larger will be the rate of charge leakage from the capacitor 6, thus, undesirably increasing the discharging rate of the electrochemical cell 4.

Using a "super-capacitor" as the capacitor 6, for example a model FEOH474Z super capacitor, commercially available from NEC corporation, Japan, does not solve the problem since such capacitors have a very high impedance value, limiting the magnitude of the instantaneous current that can be supplied by such super-capacitors. Moreover, this super capacitor has a relatively high leakage current which undesirably increases the discharging rate of the electrochemical cell.

SUMMARY OF THE INVENTION

Accordingly, it is an object of the present invention to provide a composite battery having an extended life span and capable of providing intermittent high current pulses.

There is thus provided, in accordance with a preferred embodiment of the present invention, a composite electrical battery including a primary electrochemical cell and a fully or partially discharged rechargeable electrochemical cell electrically connected in parallel to the primary electrochemical cell. The open circuit voltage of the primary electrochemical cell is significantly lower than the open circuit voltage of the rechargeable cell when the rechargeable cell is fully charged. The self discharge rate of the rechargeable electrochemical cell after electrically connecting the rechargeable electrochemical cell to the primary electrochemical cell is less than a predetermined self discharge rate.

Further, in accordance with a preferred embodiment of the present invention, after electrically connecting the primary electrochemical cell with the rechargeable electrochemical cell, the primary electrochemical cell charges the rechargeable electrochemical cell until the open circuit voltage of the composite battery stabilizes at a voltage substantially similar to the open circuit voltage of the primary electrochemical cell.

There is also provided, in accordance with a preferred embodiment of the present invention, a method for forming a composite electrical battery. The method includes the steps of providing a primary electrochemical cell, providing a fully or partially discharged rechargeable electrochemical cell, and electrically connecting the primary electrochemical cell in parallel with the fully or partially discharged rechargeable electrochemical cell to form a composite electrical battery. The open circuit voltage of the primary electrochemical cell is significantly lower than the open circuit voltage of the rechargeable cell when the rechargeable cell is fully charged. The self discharge rate of the rechargeable electrochemical cell after the step of electrically connecting is less than a predetermined self discharge rate.

Furthermore, in accordance with a preferred embodiment of the present invention, the method also includes, after the step of electrically connecting, the step of allowing the primary electrochemical cell to charge the rechargeable electrochemical cell until the open circuit voltage of the composite battery stabilizes at a voltage substantially similar to the open circuit voltage of the primary electrochemical cell.

Furthermore, in accordance with another preferred embodiment of the present invention, the rechargeable electrochemical cell is disposed within the primary electrochemical cell.

Furthermore, in accordance with yet another preferred embodiment of the present invention, the primary electrochemical cell is disposed within the rechargeable electrochemical cell.

Further still, in accordance with still another preferred embodiment of the present invention, the primary electrochemical cell is electrically connected in parallel with the rechargeable electrochemical cell by electrical connectors which are included in a printed circuit board.

Furthermore, in accordance with another preferred embodiment of the present invention, the primary electrochemical cell is a lithium/oxyhalide electrochemical cell.

Furthermore, in accordance with another preferred embodiment of the present invention, the lithium/oxyhalide electrochemical cell is a lithium/thionyl chloride electrochemical cell.

Furthermore, in accordance with another preferred embodiment of the present invention, the lithium/oxyhalide electrochemical cell is a lithium/sulfuryl chloride electrochemical cell.

Furthermore, in accordance with still another preferred embodiment of the present invention, the lithium/oxyhalide electrochemical cell includes a mixture of sulfuryl chloride and thionyl chloride.

Furthermore, in accordance with a preferred embodiment of the present invention, the rechargeable electrochemical cell is a lithium ion rechargeable cell.

Furthermore, in accordance with a preferred embodiment of the present invention, the rechargeable electrochemical cell is a rechargeable lithium polymer cell.

Finally, in accordance with a preferred embodiment of the present invention, the self discharge rate of the rechargeable electrochemical cell after electrically connecting the rechargeable electrochemical cell to the primary electrochemical cell is less than 30 percent of the initial charge of the composite battery per year at a temperature of 25 degrees centigrade.

BRIEF DESCRIPTION OF THE DRAWINGS

The invention is herein described, by way of example only, with reference to the accompanying drawings, in which like components are designated by like reference numerals, wherein.

DETAILED DESCRIPTION OF THE INVENTION

Rechargeable lithium based electrochemical cell systems are well known in the art. Such systems typically include a carbon or graphite anode and cathode materials such as $LiCoO_2$, $LiNiO_2$ and spinel $LiMn_2O_4$. Rechargeable cells based on a $LiCoO_2$ cathode are currently used as power sources for a variety of portable electronic devices.

Certain rechargeable cells, such as lithium ion rechargeable cells have a relatively high self-discharge rate when they are fully charged. Therefore, the expected capacity loss of such fully charged rechargeable cells by themselves is relatively high.

However, when the same rechargeable cells are in a partially or almost fully discharged state, they have a relatively low self discharge rate. For example, in lithium ion and lithium polymer rechargeable cells which are discharged to 10% of their maximal charge, the self discharge rate is typically only 1–3% of the charge per year at +20° C. Therefore, when such rechargeable cells are in a partially or fully discharged state they can be used instead of the capacitor 6 of FIG. 1 to improve the current delivery capability of the primary electrochemical cell 4. The use of such a fully or partially discharged rechargeable cell instead of a capacitor is advantageous since the rechargeable cell stores a significantly higher energy density and can deliver a larger charge per unit weight than most available capacitors. Additionally, in contrast to most of the super-capacitors referred to hereinabove, such rechargeable cells have a relatively low impedance and low self discharge rate, making them particularly well adapted for providing intermittent high current pulses with a pulse duration in the seconds range.

Figure 2:
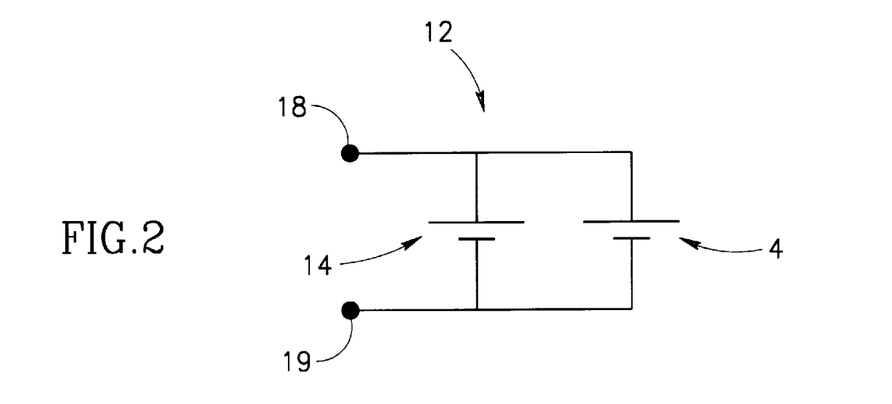
FIG. 2 is a schematic electrical circuit diagram illustrating a composite battery including an electrochemical primary cell connected in parallel with a rechargeable electrochemical cell, in accordance with a preferred embodiment of the present invention.
Figure 3:
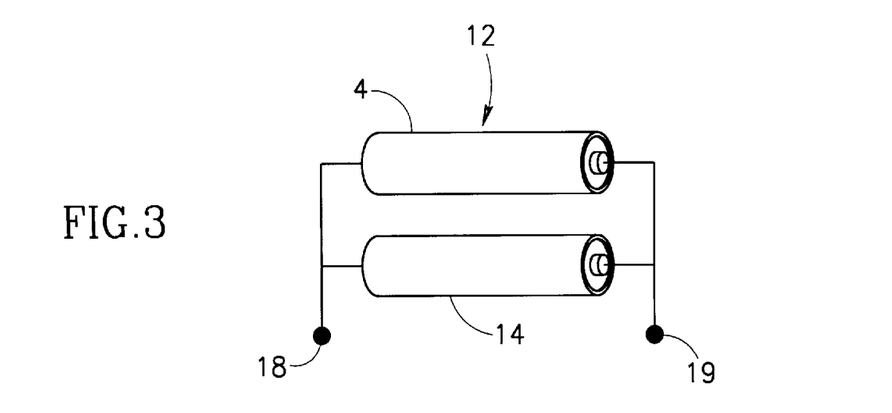
FIG. 3 is a schematic isometric view of the composite battery of FIG. 2.

Reference is now made to FIGS. 2 and 3. FIG. 2 is a schematic electrical circuit diagram illustrating a composite battery including an electrochemical primary cell electrically connected in parallel with a rechargeable electrochemical cell, in accordance with a preferred embodiment of the present invention. FIG. 3 is a schematic isometric view of the composite battery of FIG. 2.

The composite battery 12 of the of the present invention includes a primary electrochemical cell 4 electrically connected in parallel with a completely or partially discharged rechargeable electrochemical cell 14. For example, the primary electrochemical cell 4 can be a $Li/SOCl_2$ cell. The rechargeable electrochemical cell 14 can be a completely or partially discharged lithium ion rechargeable cell.

Reference is now made to TABLE 1, which includes typical open circuit voltage values of two types of primary lithium/oxyhalide cells and two types of rechargeable lithium cells. It is noted that the open circuit voltage values of TABLE 1 are only approximate and may vary.

It is further noted that the open circuit voltage values for the rechargeable lithium cells of TABLE 1 refer to fully charged cells.

TABLE 1

| CELL TYPE | CELL NAME | OPEN CIRCUIT VOLTAGE (VOLTS) |
|---|---|---|
| Primary Cells | $Li/SOCl_2$ | 3.65–3.75 |
| | $Li/SO_2Cl_2$ | 3.90–3.94 |
| Rechargeable Cells | Lithium Polymer | 4.05–4.15 |
| | Lithium ion | 4.05–4.15 |

From the open circuit voltage values of TABLE 1 it can be seen that the open circuit voltage of the $Li/SOCl_2$ primary cell 4 of FIG. 2 is approximately 3.7V. When the fully discharged lithium ion rechargeable cell 14 is connected in parallel to the $Li/SOCl_2$ primary cell 4 as shown in FIG. 2, the $Li/SOCl_2$ primary cell 4 will charge the lithium ion rechargeable cell 14 to 3.7 volt. Since a completely charged lithium ion rechargeable cell 14 has a voltage of about 4.1 volt, the $Li/SOCl_2$ primary cell 4 will charge the rechargeable lithium ion cell to only 5–10% of its full charge.

The partial charging of the lithium ion rechargeable cell 14 has two major advantages. The first advantage is that the self discharge rate of the lithium ion rechargeable cell 14 is significantly lower than its self discharge rate in the fully charged state. The second advantage is that at the partially discharged state, such as at 5–10% of its full charge, the lithium ion rechargeable cell is significantly less hazardous than at the fully charged state. At the partially charged state disclosed hereinabove, the rechargeable lithium ion cell is significantly less prone to exploding under abuse conditions such as short circuit, nail penetration and compression.

It is noted that, the $Li/SOCl_2$ primary cell 4 should be connected in parallel to, the lithium ion rechargeable cell 14 of FIG. 2 only when the lithium ion rechargeable cell 14 is in a partially or fully discharged state. If the lithium ion rechargeable cell 14 is connected in parallel to the $Li/SOCl_2$ primary cell 4 when the lithium ion rechargeable cell 14 is fully charged, the higher voltage of approximately 4.1V of the lithium ion rechargeable cell 14 will force a current to flow through the $Li/SOCl_2$ primary cell 4 which may result in an explosion of the $Li/SOCl_2$ primary cell 4 or in decomposition of the $SOCl_2$ within the primary cell 4.

Thus, when connecting the lithium ion rechargeable cell 14 in parallel with the $Li/SOCl_2$ primary cell 4 to form the composite battery of the present invention, care should be taken to ensure that the lithium ion rechargeable cell 14 is at least partially discharged such that the open circuit voltage thereof is equal to or less than the open circuit voltage of the $Li/SOCl_2$ primary cell 4 to which it is being connected.

EXAMPLE 1

An AA type $Li/SOCl_2$ cell model TL5903 size 14500, commercially available from TADIRAN BATTERIES Ltd., Israel, the assignee of the present invention, was connected in parallel to a completely discharged model TL-8103 AA size (size 14500) lithium ion $Li_xCoO_2$ cell, commercially available from TADIRAN BATTERIES Ltd. As soon as the cells are being connected, the primary $Li/SOCl_2$ cell starts to charge the lithium ion cell. The charging process is terminated after about 2 weeks when the composite battery reached the open circuit voltage of the $Li/SOCl_2$ cell of about 3.70 volts.

EXAMPLE 2

A six month old TADIRAN AA size $Li/SOCl_2$ cell and a fully discharged AA size rechargeable lithium ion cell of the types disclosed in EXAMPLE 1 were connected in parallel to form a composite battery. The voltage of the resulting composite battery started from 3.5 volt at about 5 minutes after connecting the cells and increased to 3.70 volt about 1 month after connecting the cells. When a 500 mA pulse current was applied to the composite battery, the minimum voltage under the pulse was 3.67 volt.

EXAMPLE 3

A single TADIRAN model TL5903 AA size(14500) $Li/SOCl_2$ cell was subjected to the same pulse regime described in EXAMPLE 2 for comparing the performance of the primary cell alone to that of the composite battery disclosed in EXAMPLE 2. The cell had a voltage of less than 1.7 volt during the pulse.

EXAMPLE 4

A TADIRAN model TL5903, AA size (14500) $Li/SOCl_2$ cell was connected as in EXAMPLE 2 to a fully discharged lithium ion cell of the type disclosed in EXAMPLE 2 to form a composite battery. Two weeks after electrically connecting the cells, a series of 17,000 current pulses of 500 mA having a pulse duration of one second and an inter-pulse separation of 100 seconds was applied to the composite battery. The composite battery delivered 2.35 ampere/hour before its voltage has dropped to 3.0 volt.

It is noted that, the composite battery of the present invention cannot be constructed from any pair of arbitrarily chosen primary and rechargeable cell types. Rather, the open circuit voltage of the primary cell has to be lower than the open circuit voltage attainable by the selected type of rechargeable cell when the rechargeable cell is in the maximally charged state. An additional requirement is that the self discharge rate of the selected type of rechargeable battery will be acceptably low when the rechargeable cell is charged by the selected primary cell to a voltage equal to the open circuit voltage of the primary cell to prevent excessive self discharge of the rechargeable cell and consequent undesirable current drainage from the primary cell.

It is further noted that, while FIG. 3 illustrates a simple composite battery 12 in which the primary cell 4 and the rechargeable cell 14 are separate cells which are electrically connected in parallel, other different implementations of the composite battery of the present invention are possible. For example, the rechargeable cell may be disposed within the primary cell.

Figure 4:
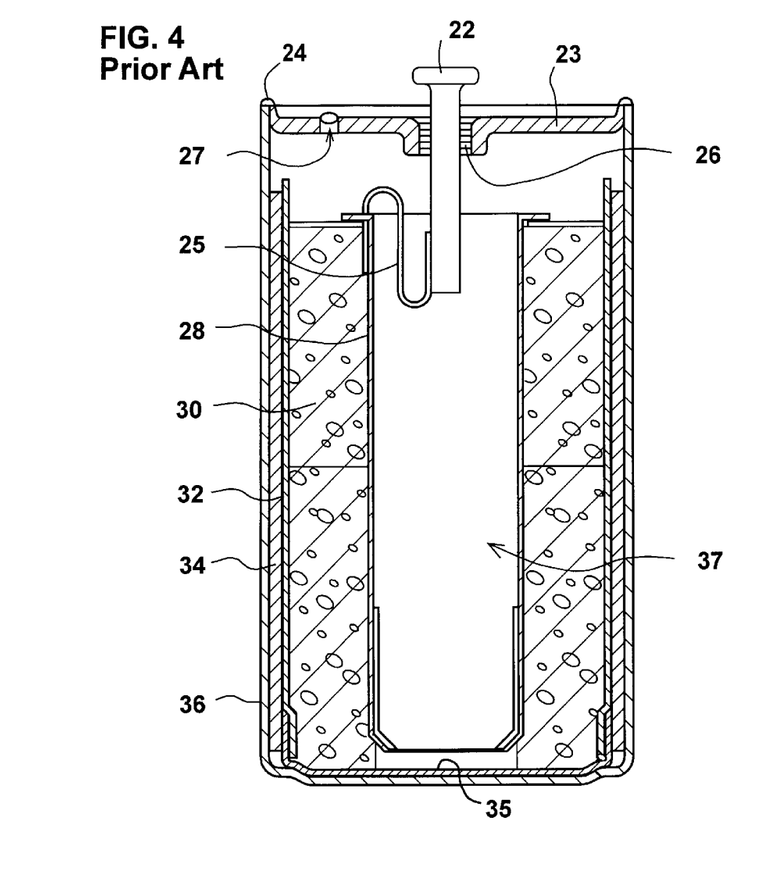
FIG. 4 is a schematic cross section of a primary lithium/oxyhalide electrochemical cell useful in constructing a composite battery, in accordance with another preferred embodiment of the present invention.

Reference is now made to FIG. 4 which is a schematic cross section of a prior art primary lithium/oxyhalide electrochemical cell useful in constructing a composite battery, in accordance with another preferred embodiment of the present invention.

The exemplary primary electrochemical cell 20 of FIG. 4 is a TADIRAN model TL-5930D-size (33500) $Li/SOCl_2$ electrochemical cell. The primary electrochemical cell 20 includes a can 36 made from nickel plated cold rolled steel. A cell cover 23, made from nickel plated cold rolled steel, is welded to the can 36 to form a hermetically welded seam 24. The cell cover 23 also includes a positive terminal 22 which is attached to and electrically isolated from the cell cover 23 by a glass to metal seal 26. The cell cover 23 also includes a filling hole 27 therein for filling the thionyl chloride electrolyte therethrough. The filling hole 27 is hermetically sealed by welding a metal ball 29 to the cell cover 23 after filling the cell with thionyl chloride electrolyte.

The primary electrochemical cell 20 also includes a current collector 28. The current collector 28 has a solvent space 37 therein. The current collector 28 is electrically connected to the positive terminal 22 by a nickel strip 25. The primary electrochemical cell 20 also includes a separator 32 and a carbon cathode 30. The carbon cathode 30 is disposed between and in contact with the current collector 28 and the separator 32. The primary electrochemical cell 20 further includes a lithium anode 34 disposed between the can 36 and the separator 32. The separator 32 and the carbon cathode 30 are separated from the bottom part of the can 36 by a glass-fiber bottom separator 35.

Figure 5:
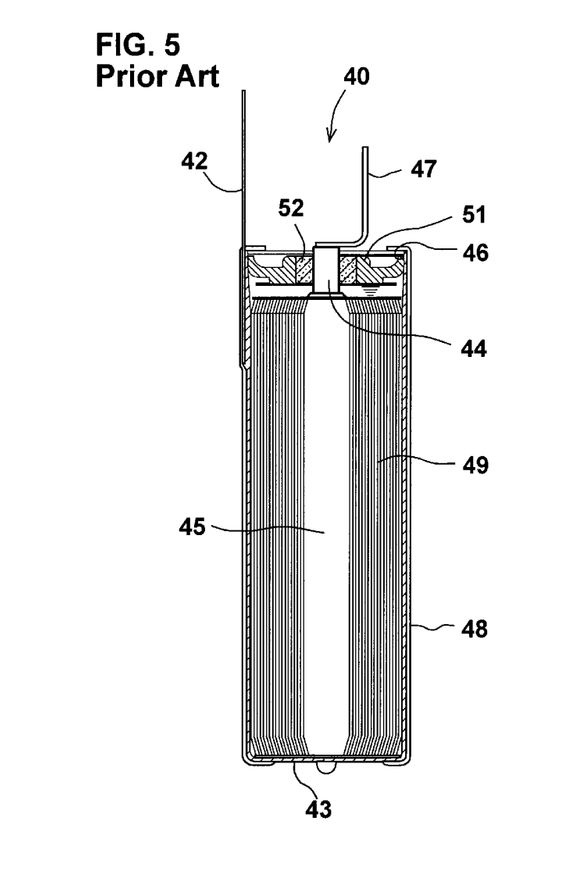
FIG. 5 is a schematic cross section of a rechargeable lithium ion electrochemical cell useful in constructing a composite battery, in accordance with a preferred embodiment of the present invention.

Reference is now made to FIG. 5 which is a schematic cross section of a prior art rechargeable lithium ion electrochemical cell useful in constructing a composite battery, in accordance with a preferred embodiment of the present invention.

The exemplary rechargeable lithium ion electrochemical cell 40 of FIG. 5 is a Tadiran model TL-8103AA-size (14500) $Li_xCoO_2$ rechargeable electrochemical cell. The rechargeable cell 40 includes a can 43 made of nickel plated cold rolled steel. The rechargeable cell 40 also includes a cell cover 51 made of nickel plated cold rolled steel which is welded to the can 43 to form a hermetically sealed welded seam 46. The cell cover 51 also includes a positive terminal 44 which is attached to and electrically isolated from the cell cover 51 by a glass-to-metal seal 52. The rechargeable cell 40 further includes a core assembly 49 which is formed from a carbon anode on a copper foil (not shown), a polypropylene separator (not shown) and a lithium/cobalt oxide cathode on an aluminum foil (not shown) which are wound in a "jelly-roll" configuration. A negative terminal 42 is welded to the can 43 and a conducting nickel strip 47 is welded to the positive terminal 44. The space 45 within the core assembly 49 is filled with a solution of $LIPF_6$ in ethylene carbonate based solution. The can 43 is sheathed in a polyvinyl chloride (PVC) sleeve 48.

Figure 6:
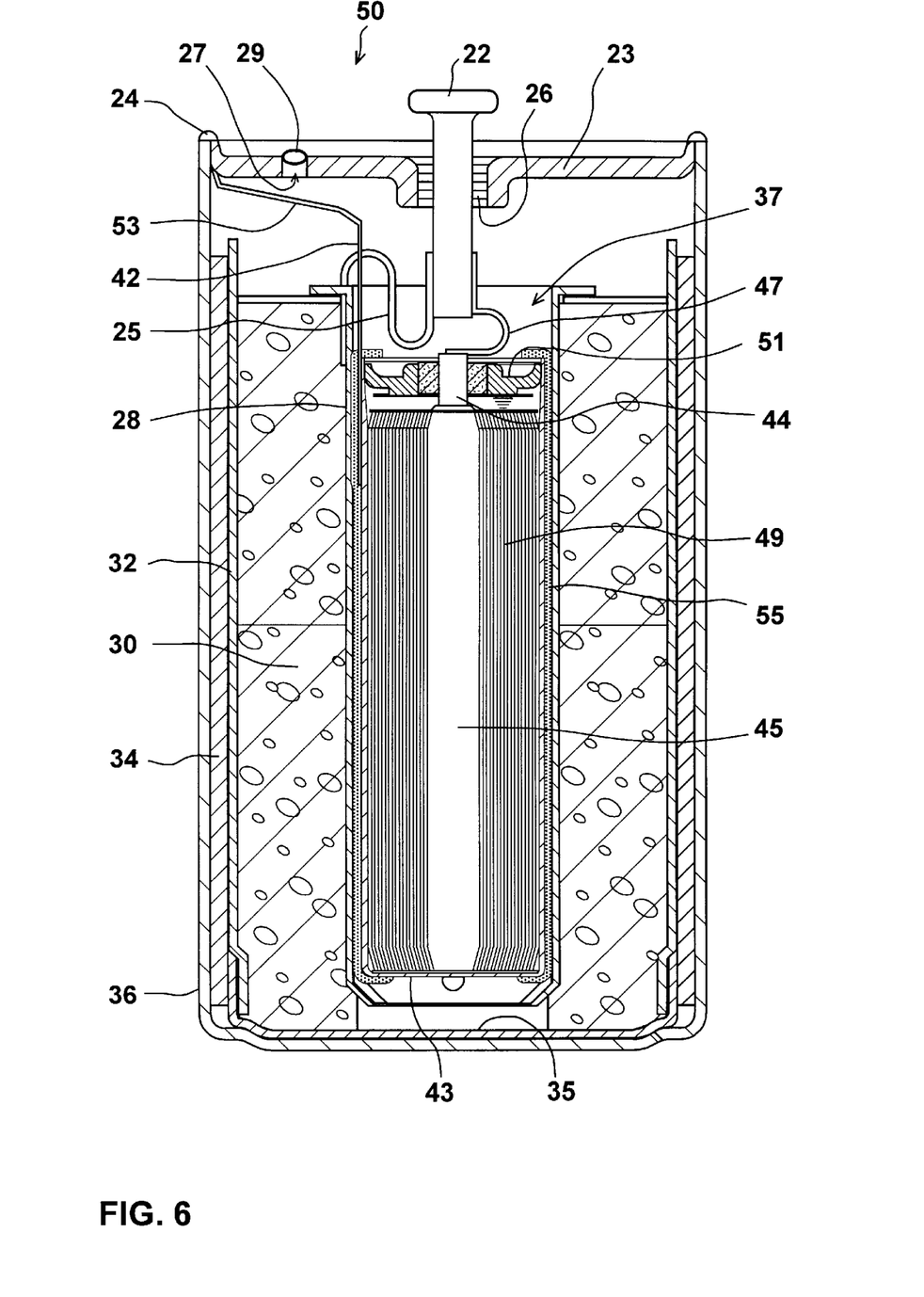
FIG. 6 is a schematic cross section illustrating a composite battery, constructed from a modified rechargeable lithium ion electrochemical cell of FIG. 5 and the primary lithium/oxyhalide electrochemical cell of FIG. 4, in accordance with a preferred embodiment of the present invention.

Reference is now made to FIG. 6 which is a schematic cross section illustrating a composite battery 50, constructed from the rechargeable lithium ion electrochemical cell 40 of FIG. 5 and the primary lithium/oxyhalide electrochemical cell 20 of FIG. 4, modified by replacing the PVC sleeve 48 by a polytetrafluoroethylene (PTFE) sleeve 55, in accordance with a preferred embodiment of the present invention.

The composite battery 50 of FIG. 6 is formed by inserting a fully discharged, hermetically sealed, rechargeable lithium ion cell 40 of FIG. 5 inside the primary electrochemical cell 20 of FIG. 4 prior to the welding of the cell cover 23 to the can 36, after replacing the PVC sleeve 48 by a PTFE sleeve 55. The negative terminal 42 is electrically connected to the lithium anode 34 through the can 36 by means of a nickel tab 53 which is welded to the can 36. The positive terminal 44 is electrically connected to the current collector 28 of the primary cell 20 by welding the conductive nickel strip 47 to the positive terminal 22 of the primary cell 20.

The negative can 43 is electrically isolated from the positive current collector 28 of the primary cell 20 by the PTFE sleeve 55 which is compatible with the $SOCl_2$ solutions of the primary cell 20.

The cell cover 23 is then suitably positioned on the can 36 and welded to the can 36 to form the hermetically welded seam 24. After injection of the thionyl chloride solution into the composite battery 50 through the opening, the composite battery 50 is sealed by resistance welding of the metal ball 29 to the cell cover 23, closing the filling hole 27 and hermetically sealing the composite battery 50.

EXAMPLE 5

A composite battery was constructed as disclosed hereinabove and illustrated in FIG. 6. The open circuit voltage of this composite battery increased from about 3.5 volt at few minutes after filling the electrolyte to 3.7 volt at about 7 days after filling the electrolyte. A one second current pulse of 500 mA was applied to the composite battery. The battery's voltage started from 3.70 volt and decreased to 3.68 volt at the end of the pulse.

EXAMPLE 6

A single TADIRAN model TL-5930 D-size (33500) primary $Li/SOCl_2$ electrochemical cell, had an open circuit voltage of 3.63 volt measured 5 minutes after filling the electrolyte. The open circuit voltage of the cell increased to 3.70 volt as measured 4 hours after filling the electrolyte. The cell remained at this 3.7 volt level for two weeks. When a 500 mA current pulse having a one second duration was applied to the primary cell, the measured cell voltage started from 2.0 volts and increased to 2.5 volts at the end of the pulse.

Thus, the composite battery of EXAMPLE 5 exhibits a superior current delivery performance compared to the single primary $Li/SOCl_2$ cell of EXAMPLE 6.

When the size of the required primary cell is larger than the largest commercially available primary cell, the required composite battery (not shown) may include a plurality of primary cells electrically connected in parallel and one or more rechargeable cell which are electrically connected in parallel with the plurality of primary cells.

EXAMPLE 7

A composite battery was formed by electrically connecting in parallel two TADIRAN model TL-5903 AA size (14500) $Li/SOCL_2$ primary cells, each having nominal charge of 2.40 ampere/hour (AH), and a single fully discharged TADIRAN model TL-8103 AA size (14500) $Li_x$-$CoO_2$ rechargeable electrochemical cell. Two weeks after connection of these cells in parallel, the composite battery was subjected to the same current pulse regime as disclosed in EXAMPLE 4 hereinabove, except that the inter-pulse intervals were 50 seconds long. The composite battery delivered 4.7 AH (out of 4.8 AH) before its voltage has dropped to 3.0 volts.

It is noted that the single electrochemical cell of examples 3 and 6 are not part of the present invention and are given only for the purpose of comparing their properties with those of the preferred embodiments of the present invention.

It is further noted that, while the preferred embodiments of the composite battery disclosed hereinabove describe pre-assembled composite batteries in which the primary cell and the rechargeable cell are connected in parallel prior to being used, it is also possible to construct a composite battery by using a discrete primary cell and a discrete rechargeable cell and by implementing the parallel connection of the primary and the rechargeable cells by pre-wired conducting elements included in the circuitry which is to be powered by the composite battery.

It is still further noted that, while the preferred embodiments of the composite battery of the present invention disclosed hereinabove include a primary $Li/SOCl_2$ cell and a lithium ion rechargeable cell, the composite battery of the present invention may also be formed by electrically connecting in parallel, as disclosed in detail hereinabove, the following electrochemical cell pairs: a primary $Li/SOCl_2$ electrochemical cell and a lithium polymer rechargeable cell, a primary $Li/SO_2Cl_2$ electrochemical cell and a lithium ion rechargeable cell, and a primary $Li/SO_2Cl_2$ electrochemical cell and a lithium polymer rechargeable cell.

Figure 7:
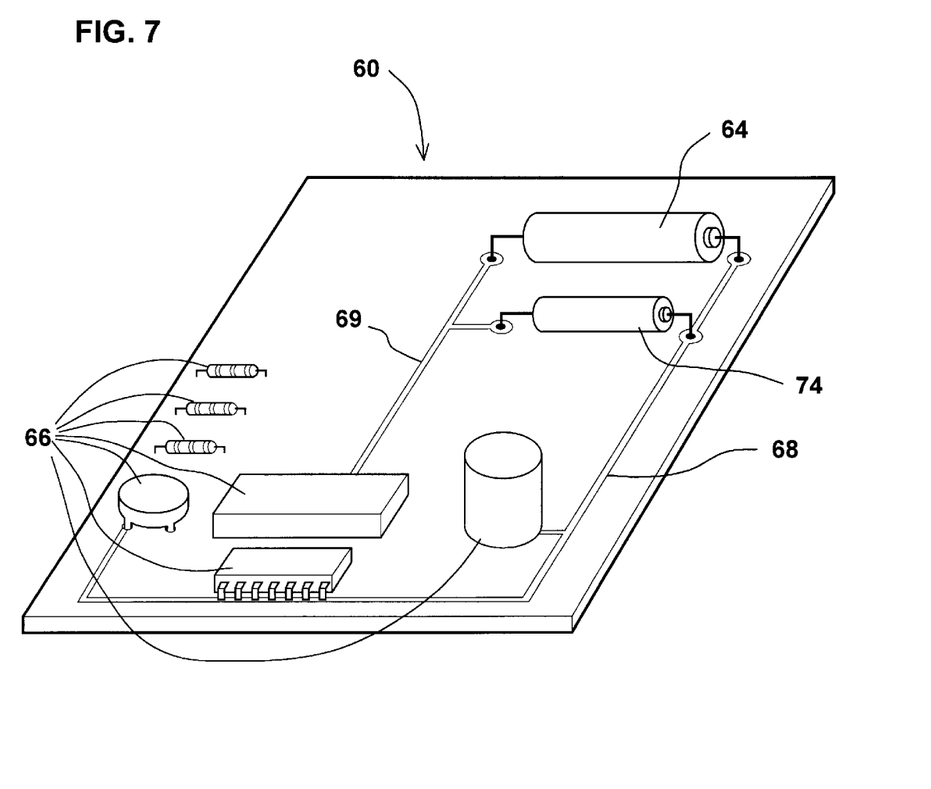
FIG. 7 is a schematic isometric view of a printed circuit board including a primary electrochemical cell and a rechargeable electrochemical cell which are electrically connected in parallel through electrical connectors on the printed circuit board to form a composite battery, in accordance with another preferred embodiment of the present invention.

Reference is now made to FIG. 7 which is a schematic isometric view of a printed circuit board including a primary electrochemical cell and a rechargeable electrochemical cell which are electrically connected in parallel through electrical connectors on the printed circuit board to form a composite battery, in accordance with another preferred embodiment of the present invention.

The printed circuit board 60 includes a primary electrochemical cell 64 and a rechargeable electrochemical cell 74. The primary electrochemical cell 64 and the rechargeable electrochemical cell 74 are electrically connected in parallel by suitable electrical connectors 68 and 69 included in the printed circuit board 60. The printed circuit board 60 also includes electrical components 66 which together form the electrical circuitry (not shown in detail) which is powered by the combination of the primary electrochemical cell 64 and the rechargeable electrochemical cell 74. Care must be taken to ensure that the current flow between the primary electrochemical cell 64 and the rechargeable electrochemical 74 cell will not be blocked by any of the electrical components 66 of the printed circuit board 60.

It is noted that, while the composite battery of the present invention has been adapted for use with a primary Li/oxyhalide cell and a rechargeable lithium ion cell or lithium polymer cell, other implementations of the composite battery of the present invention may be constructed using other different types of primary cell and rechargeable cell which are within the scope and spirit of the present invention provided that the rechargeable cell has an acceptably low self discharge rate when it is electrically connected in parallel to the primary cell, and charged by the primary cell.

It is further noted that, while the preferred embodiments of the present invention disclose a composite battery in which the rechargeable cell is disposed inside the primary cell or outside the primary cell, many other possible mechanical arrangements of the primary cell and the rechargeable cell of the composite battery are possible which are within the scope of the present invention. For example, the primary cell may be disposed within the rechargeable cell (not shown) or the primary cell and the rechargeable cell may both be disposed within a housing (not shown).

It is still further noted that, while the preferred embodiments of the present invention disclose a composite battery in which the size of the rechargeable cell is either equal to or smaller than the size of the primary cell, other cell size combinations are possible which are within the scope of the present invention. The choice of the sizes of the primary cell and the rechargeable cell of the composite battery is determined, inter alia, by the needs of each specific application such as the required current, voltage and capacitance, the amplitude and frequency of the current pulses required by the application and by manufacturing considerations. However, generally, the primary cell cannot be much smaller than the rechargeable cell so that the rechargeable cell can accumulate a maximal charge.

It is yet further noted that, while the preferred embodiments of the composite battery disclosed hereinabove and illustrated in FIGS. 2, 3 and 7 include a single primary electrochemical cell and a single rechargeable electrochemical cell, many other preferred embodiments of the present invention are possible which include more than one primary cell and/or more than one rechargeable cell electrically connected in parallel, which are within the scope of the present invention.

While the invention has been described with respect to a limited number of embodiments, it will be appreciated that many variations, modifications and other applications of the invention may be made.

What is claimed is:

1. A composite electrical battery, comprising:
   a primary electrochemical cell; and
   a fully or partially discharged rechargeable electrochemical cell electrically connected in parallel to said primary electrochemical cell,
   wherein the open circuit voltage of said primary electrochemical cell is lower than the open circuit voltage of said rechargeable cell when said rechargeable cell is not connected to said primary cell and is fully charged, and wherein the self discharge rate of said rechargeable electrochemical cell after electrically connecting said rechargeable electrochemical cell to said primary electrochemical cell is less than the self discharge rate of said rechargeable electrochemical cell when said rechargeable electrochemical cell is not connected to said primary cell and is fully charged.

2. The composite battery according to claim 1, wherein after electrically connecting said primary electrochemical cell with said rechargeable electrochemical cell, said primary electrochemical cell charges said rechargeable electrochemical cell until the open circuit voltage of said composite battery stabilizes at a voltage equal to or lower than the open circuit voltage of said primary electrochemical cell prior to said electrically connecting.

3. The composite battery according to claim 1 wherein said rechargeable electrochemical cell is disposed within said primary electrochemical cell.

4. The composite battery according to claim 1 wherein said primary electrochemical cell is disposed within said rechargeable electrochemical cell.

5. The composite battery according to claim 1 wherein said primary electrochemical cell is electrically connected in parallel with said rechargeable electrochemical cell by electrical connectors which are included in a printed circuit board.

6. The composite battery according to claim 1 wherein said primary electrochemical cell is a lithium/oxyhalide electrochemical cell.

7. The composite battery according to claim 6 wherein said lithium/oxyhalide electrochemical cell is a lithium/thionyl chloride electrochemical cell.

8. The composite battery according to claim 6 wherein said lithium/oxyhalide electrochemical cell is a lithium/sulfuryl chloride electrochemical cell.

9. The composite battery according to claim 6 wherein said lithium/oxyhalide electrochemical cell comprises a mixture of sulfuryl chloride and thionyl chloride.

10. The composite battery according to claim 1 wherein said rechargeable electrochemical cell is a lithium ion rechargeable cell.

11. The composite battery according to claim 1 wherein said rechargeable electrochemical cell is a rechargeable lithium polymer cell.

12. The composite battery according to claim 1 wherein said self discharge rate of said rechargeable electrochemical cell after electrically connecting said rechargeable electrochemical cell to said primary electrochemical cell is less than 30 percent of the initial charge of said composite battery per year at a temperature of 25 degrees centigrade.

13. A method for forming a composite electrical battery, the method comprising the steps of:
   providing a primary electrochemical cell;
   providing a fully or partially discharged rechargeable electrochemical cell; and electrically connecting said primary electrochemical cell in parallel with said fully or partially discharged rechargeable electrochemical cell to form said composite electrical battery, wherein the open circuit voltage of said primary electrochemical cell is lower than the open circuit voltage of said rechargeable cell when said rechargeable cell is not connected to said primary cell and is fully charged, and wherein the self discharge rate of said rechargeable electrochemical cell after the step of electrically connecting is less than the self discharge rate of said rechargeable electrochemical cell when said rechargeable electrochemical cell is not connected to said primary cell and is fully charged.

14. The method according to claim 13, further comprising after said step of electrically connecting the step of allowing said primary electrochemical cell to charge said rechargeable electrochemical cell until the open circuit voltage of said composite battery stabilizes at a voltage equal to or lower than the open circuit voltage of said primary electrochemical cell prior to said step of electrically connecting.

15. The method according to claim 13 wherein said rechargeable electrochemical cell is disposed within said primary electrochemical cell.

16. The method according to claim 13 wherein said primary electrochemical cell is disposed within said rechargeable electrochemical cell.

17. The method according to claim 13 wherein said primary electrochemical cell is electrically connected in parallel with said rechargeable electrochemical cell by electrical connectors which are included in a printed circuit board.

18. The method according to claim 13 wherein said primary electrochemical cell is a lithium/oxyhalide electrochemical cell.

19. The method according to claim 18 wherein said lithium/oxyhalide electrochemical cell is a lithium/thionyl chloride electrochemical cell.

20. The method according to claim 18 wherein said lithium/oxyhalide electrochemical cell is a lithium/sulfuryl chloride electrochemical cell.

21. The method according to claim 18 wherein said lithium/oxyhalide electrochemical cell comprises a mixture of sulfuryl chloride and thionyl chloride.

22. The method according to claim 13 wherein said rechargeable electrochemical cell is a lithium ion rechargeable cell.

23. The method according to claim 13 wherein said rechargeable electrochemical cell is a rechargeable lithium polymer cell.

24. The method according to claim 13 wherein said self discharge rate of said rechargeable electrochemical cell after electrically connecting said rechargeable electrochemical cell to said primary electrochemical cell is less than 30 percent of the initial charge of said composite battery per year at a temperature of 25 degrees centigrade.

* * * * *